United States Patent
Rogers et al.

(10) Patent No.: US 7,866,756 B2
(45) Date of Patent: Jan. 11, 2011

(54) SIDE DUMP BODY HAVING AN INCREASED CARRYING CAPACITY

(76) Inventors: Ralph R. Rogers, 841 N. Shay Rd., Dakota Dunes, SD (US) 57049; Bobby Rogers, 610 Lakeview Dr., North Sioux City, SD (US) 57049

( * ) Notice: Subject to any disclaimer, the term of this patent is extended or adjusted under 35 U.S.C. 154(b) by 475 days.

(21) Appl. No.: 12/012,100

(22) Filed: Jan. 31, 2008

(65) Prior Publication Data
US 2009/0195050 A1     Aug. 6, 2009

(51) Int. Cl.
*B60P 1/16* (2006.01)
(52) U.S. Cl. ............... 298/17.7; 298/18; 298/22 F; 298/19 V; 298/23 MD
(58) Field of Classification Search ............ 298/13, 298/17.5, 17.6, 17.7, 18, 22 R, 22 P, 22 F, 298/21 R, 19 V, 23 DF, 23 MD, 23 D, 25; 414/470
See application file for complete search history.

(56) References Cited

U.S. PATENT DOCUMENTS

| 10,441 | A | * | 1/1854 | Bailey ............... 298/17.7 |
| 5,480,214 | A | | 1/1996 | Rogers |
| 5,967,615 | A | | 10/1999 | Rogers |
| 6,056,368 | A | | 5/2000 | Rogers |
| 6,179,385 | B1 | | 1/2001 | Rogers |
| 6,199,955 | B1 | | 3/2001 | Rogers |

* cited by examiner

*Primary Examiner*—Stephen Gordon
(74) *Attorney, Agent, or Firm*—Dennis L. Thomte; Thompte Patent Law Office LLC

(57) ABSTRACT

A wall extension apparatus is movably positioned on the upper end of a side dump body to increase the carrying capacity thereof. The extension apparatus may be pivotally moved from a transport position to either a first side dumping position to a second side dumping position. When in its transport position, the extension apparatus extends upwardly from the upper ends of the side dump body. Various embodiments of the invention are disclosed.

5 Claims, 12 Drawing Sheets

SIDE DUMP BODY HAVING AN INCREASED CARRYING CAPACITY

BACKGROUND OF THE INVENTION

1. Field of the Invention

This invention relates to a side dump body for a truck or trailer and more particularly to a side dump body which has an increased carrying capacity when compared to existing side dump trailers. More particularly, the carrying capacity of the side dump body is increased through the use of a wall extension apparatus which is movably positioned on the upper end of the side dump body.

2. Description of the Related Art

Side dump bodies for use on trucks and trailers have become extremely popular in recent years since the introduction of the side dump trailer of co-applicant which is disclosed in U.S. Pat. No. 5,480,214. In co-applicant's original side dump trailer, the side dump body included a bottom wall having side walls extending upwardly and outwardly from the side edges thereof with the rearward and forward ends of the body being closed by a rear wall and a front wall, respectively. The side dump body of co-applicant's previous invention could be pivotally moved to either side of the truck or trailer to dump the contents of the side dump body. Although the side dump body of co-applicant's previous invention has met with great success, the side dump body thereof is somewhat limited in its carrying capacity due to the required shape of the dump body which enables the dump body to be moved to its dumping position. The dump body of co-applicant's previous invention may be increased in height to increase the carrying capacity, but if the side walls thereof are extended to increase the carrying capacity thereof, the side dump body would exceed highway width restrictions.

In an effort to solve the problems of the prior art, co-applicant invented and patented the side dump bodies disclosed in U.S. Pat. Nos. 5,967,615; 6,056,368; 6,179,385 and 6,199,955. Although the side dump bodies disclosed in the above-identified patents have met with success, applicants have devised a new method of increasing the carrying capacity of a side dump trailer through the use of a wall extension apparatus such as disclosed hereinafter.

SUMMARY OF THE INVENTION

A side dump body having an increased carrying capacity is disclosed wherein the side dump body is pivotally mounted on a wheeled frame of a truck or trailer. The side dump body is pivotally movable with respect to the wheeled frame so as to be able to dump the contents thereof at either the first side of the wheeled frame or the second side of the wheeled frame. The side dump body includes a bottom wall, first and second side walls extending upwardly from the bottom wall, a forward end wall and a rearward end wall. Each of the first and second side walls of the side dump body have forward and rearward ends with each of the forward and rearward end walls of the side dump body having first and second ends with the side walls and the end walls of the side dump body have upper ends.

A wall extension apparatus is movably positioned on the upper ends of the walls of the side dump body as illustrated in the drawings wherein five different embodiments of the wall extension apparatus are shown. In one embodiment, the wall extension apparatus includes an upstanding first side wall member having upper and lower ends and forward and rearward ends, an upstanding second side wall member having upper and lower ends and forward and rearward ends, an upstanding forward end wall member having upper and lower ends and first and second ends, and an upstanding rearward end wall member having upper and lower ends and first and second ends. The first side wall member, the second side wall member, the forward end wall member and the rearward wall member of the wall extension apparatus are normally positioned on the upper ends of the first side wall, the second side wall, the forward end wall and the rearward end wall of the side dump body respectively. The wall extension apparatus of this embodiment is selectively pivotally movable with respect to the side dump body between a transport position to either a first side dumping position or to a second side dumping position. The lower ends of the first side wall member, the second side wall member, the forward end wall member and the rearward end wall member of the wall extension apparatus are in sealing engagement with the upper ends of the first side wall, the second side wall, the forward end wall and the rearward end wall of the side dump body respectively when the wall extension apparatus is in its transport position. The lower end of the first side wall member of the wall extension apparatus is spaced from the upper end of the first side wall of the dump body when the wall extension apparatus is in its first side dumping position. The lower end of the second side member of the wall extension apparatus is spaced from the upper end of the second side wall of the side dump body when the wall extension apparatus is in its second side dumping position. A forward hydraulic cylinder is secured to the forward end wall of the side dump body and to the forward end wall member of the wall extension apparatus and a rearward hydraulic cylinder is secured to the rearward end wall of the side dump body and to the rearward end wall member of the wall extension device for pivotally moving the wall extension apparatus between its transport position, its first side dumping position and its second side dumping position.

In another embodiment, the forward end wall member of the wall extension apparatus just described is replaced by a pair of forward wall members which are pivotally secured together. In this embodiment, the upstanding rearward wall member of the previous embodiment is replaced by a pair of rearward wall members which are pivotally secured together. In this embodiment, a first forward hydraulic cylinder is pivotally secured to and extends between the forward end wall members of the wall extension apparatus and a second rearward hydraulic cylinder is pivotally connected to and extends between the first and second rearward end wall members of the wall extension apparatus for pivotally moving the wall extension apparatus from its transport position to either of its first or second side dumping positions.

In another embodiment of the invention, the wall extension apparatus is essentially identical to the embodiment discussed immediately above except that four hydraulic cylinders are used to pivotally move the wall extension apparatus between its transport position, its first side dumping position and its second side dumping position.

In yet another embodiment, the structure of the wall extension apparatus is substantially the same as the first and second embodiments discussed above except that the wall extension apparatus of this embodiment is moved between its transport position, its first side dumping position and its second side dumping position by a pulley and cable arrangement at the forward and rearward ends thereof.

In still another embodiment, the wall extension apparatus only includes a single side wall member which is pivotally secured to the forward and rearward ends of the side dump body by forward and rearward end wall members secured to the opposite ends of the side wall member with the inner ends of the forward and rearward end wall members being pivoted to the upper central positions of the forward and rearward end walls of the side dump body respectively. In this embodiment, the wall extension apparatus is manually moved between its transport position to either a first side dumping position or to a second side dumping position.

It is therefore a principle object of the invention to provide an improved side dump body for a truck or trailer which has an increased carrying capacity compared to prior art side dump bodies.

A further object of the invention is to provide a wall extension apparatus for a side dump body which increases the carrying capacity thereof and which is movable between a transport position, a first side dumping position and a second side dumping position.

A further object of the invention is to provide a wall extension apparatus for a side dump trailer which is easily attached to existing side dump bodies without extensive modification thereof.

These and other objects will be apparent to those skilled in the art.

DESCRIPTION OF THE PREFERRED EMBODIMENT

Figure 1:
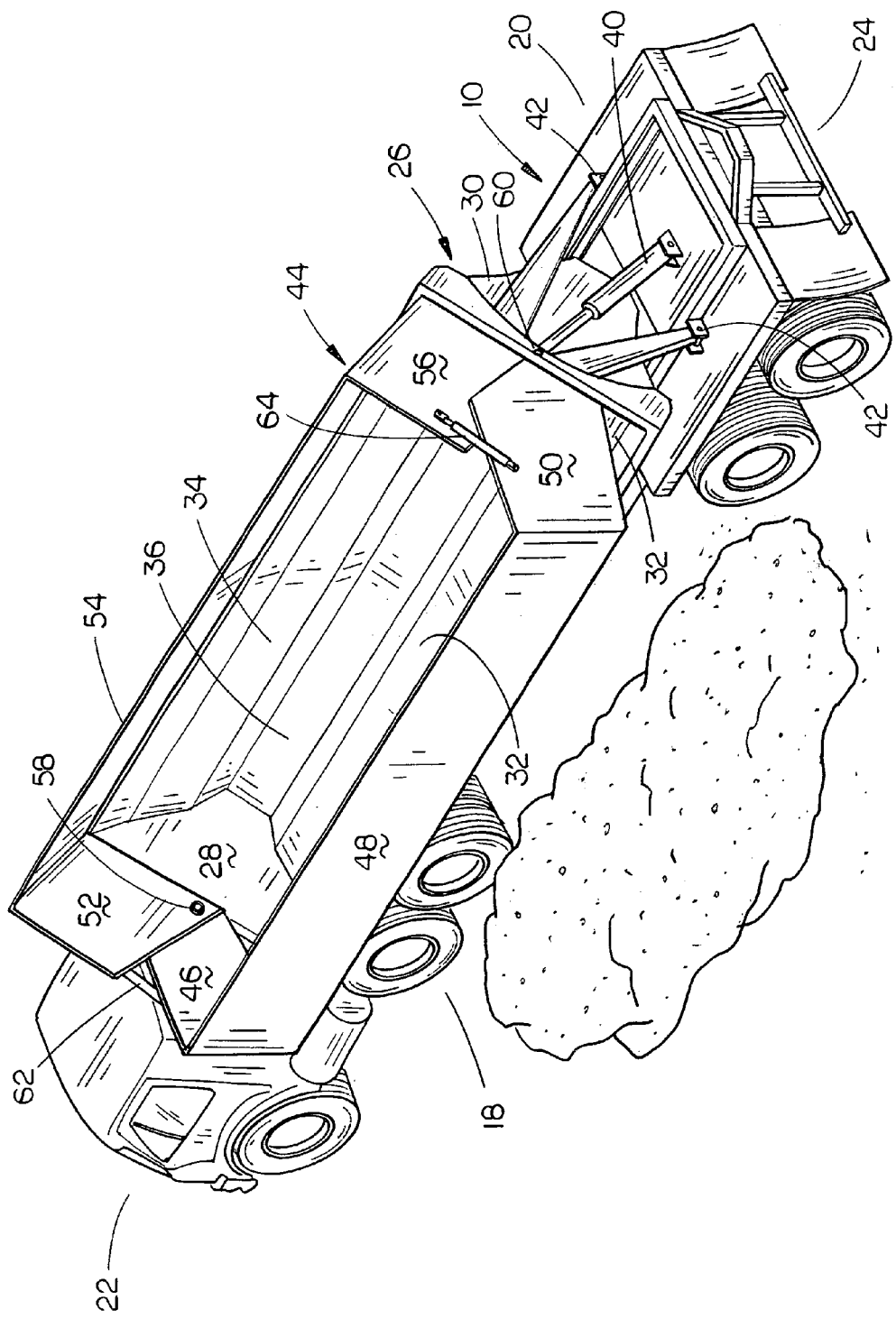
FIG. 1 is a rear prospective view of a conventional side dump trailer illustrated in its side dumping position and which has the first embodiment of the invention positioned thereon.
Figure 2:
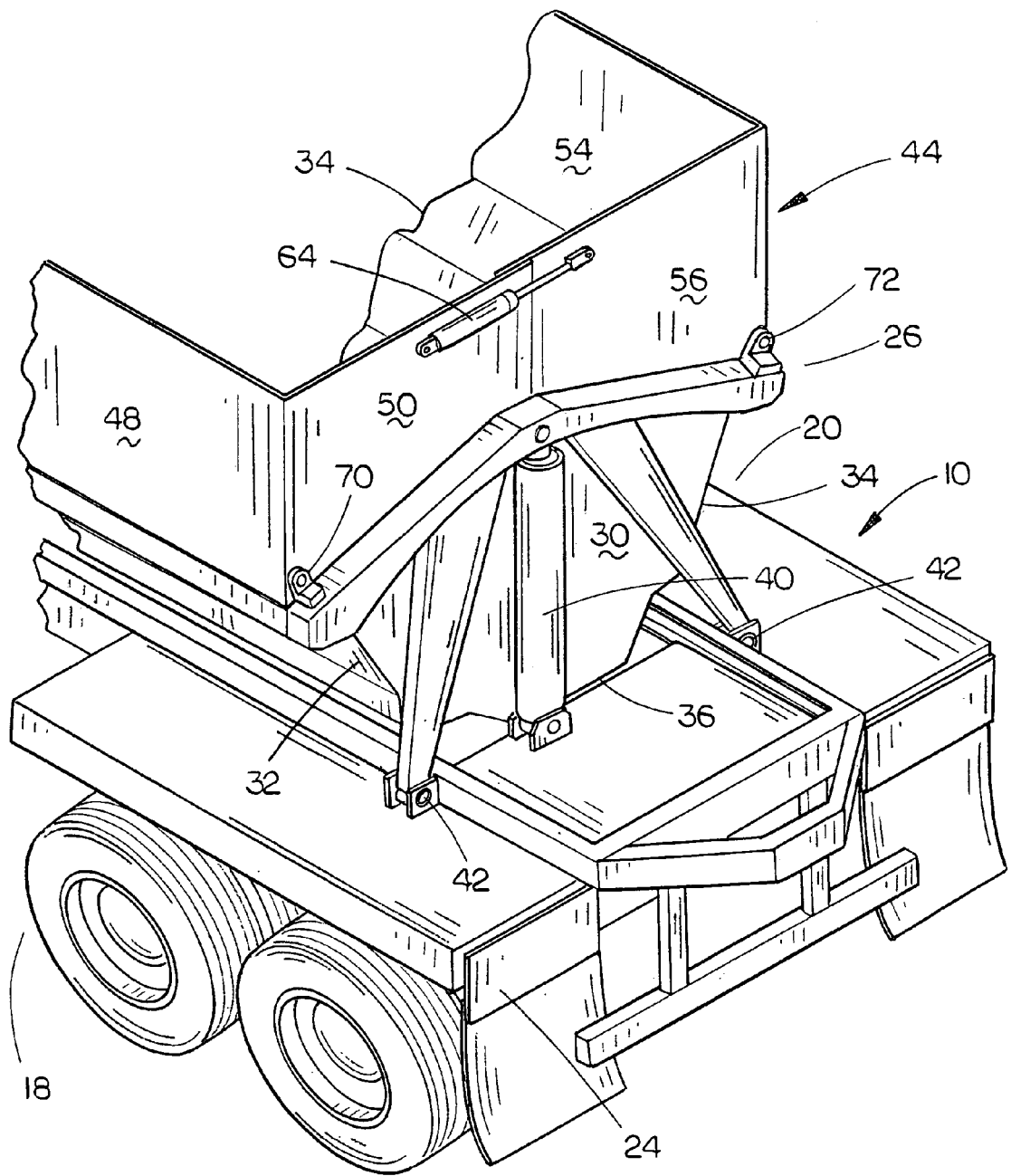
FIG. 2 is a partial rear prospective view of the embodiment of FIG. 1.

The numeral 10 refers generally to a wheeled frame which may be part of a truck or trailer. Wheeled frame 10 includes a pair of longitudinal extending frame members 12 and 14 having a plurality of cross members 16 positioned thereon and extending therebetween. For purposes of description, the wheeled frame 10 will be described as having a first side 18, a second side 20, a forward end 22 and a rearward end 24.

A conventional side dump body is referred to generally by the reference numeral 26. For purposes of description, side dump body 26 will be described as having a forward end wall 28, a rearward end wall 30, a first side wall 32 a second side wall 34 and a bottom wall 36. A forward hydraulic cylinder (not shown) is pivotally secured to the framework of the forward end wall 28 and the wheeled frame 10 and extends therebetween. A hydraulic cylinder 40 is pivotally secured to and extends between the framework of the rearward end wall 30 and the wheeled frame 10 as seen in FIG. 1 in an identical fashion to the forward hydraulic cylinder. The hydraulic cylinders are provided to pivot the side dump body 26 between its transport position, a first side dumping position and a second side dumping position in conventional fashion. The side dump body 26 also includes releasable locking or hinge pins generally referred to by the reference numeral 42 so that the side dump body 26 may be pivoted to its side dumping positions in conventional fashion such as described in co-applicants' earlier U.S. Pat. No. 5,480,214. Although a particular shape of a side dump body 26 is illustrated in the drawings, the side dump body 26 may take many different shapes but in all cases, the end walls 28 and 30 and the side walls 32 and 34 will have upper ends which define an open upper end of the side dump body to permit contents or materials to be dumped into and therefrom.

It is to the conventional side dump bodies that applicants' extension wall apparatus is utilized which is referred to generally by the reference numeral 44 in FIGS. 1-5 which illustrate applicants' first embodiment of the wall extension apparatus. Wall extension apparatus 44 includes a first forward end wall member 46, a first side wall member 48, a first rearward end wall member 50, a second forward end wall member 52, a second side wall member 54, and a second rearward end wall member 56. The lower inner ends of end wall members 46 and 52 are pivotally secured together by a pivot pin 58, which is also pivotally secured to the framework of the forward end wall 28. The lower inner ends of rearward end wall members 50 and 56 are pivotally secured together by means of a pivot pin 60 which also is pivotally secured to the framework of the rearward end wall 30 of side dump body 26.

A hydraulic cylinder 62 is pivotally secured to and extends between forward wall members 46 and 52 and a hydraulic cylinder 64 is pivotally secured to and extends between the rearward wall members 50 and 56 as illustrated in FIG. 1. Selectively removable locking pins 66 and 68 selectively lock the lower outer ends of forward wall members 46 and 52 to the framework of the forward end wall 28 and selectively removable locking pins 70 and 72 selectively lock the lower outer ends of the rearward end wall members 50 and 56 to the framework of rearward wall 30. As seen in the drawings, the inner ends of the end wall members 46 and 52 overlap one another as do the inner ends of the end wall members 50 and 56.

Figure 3:
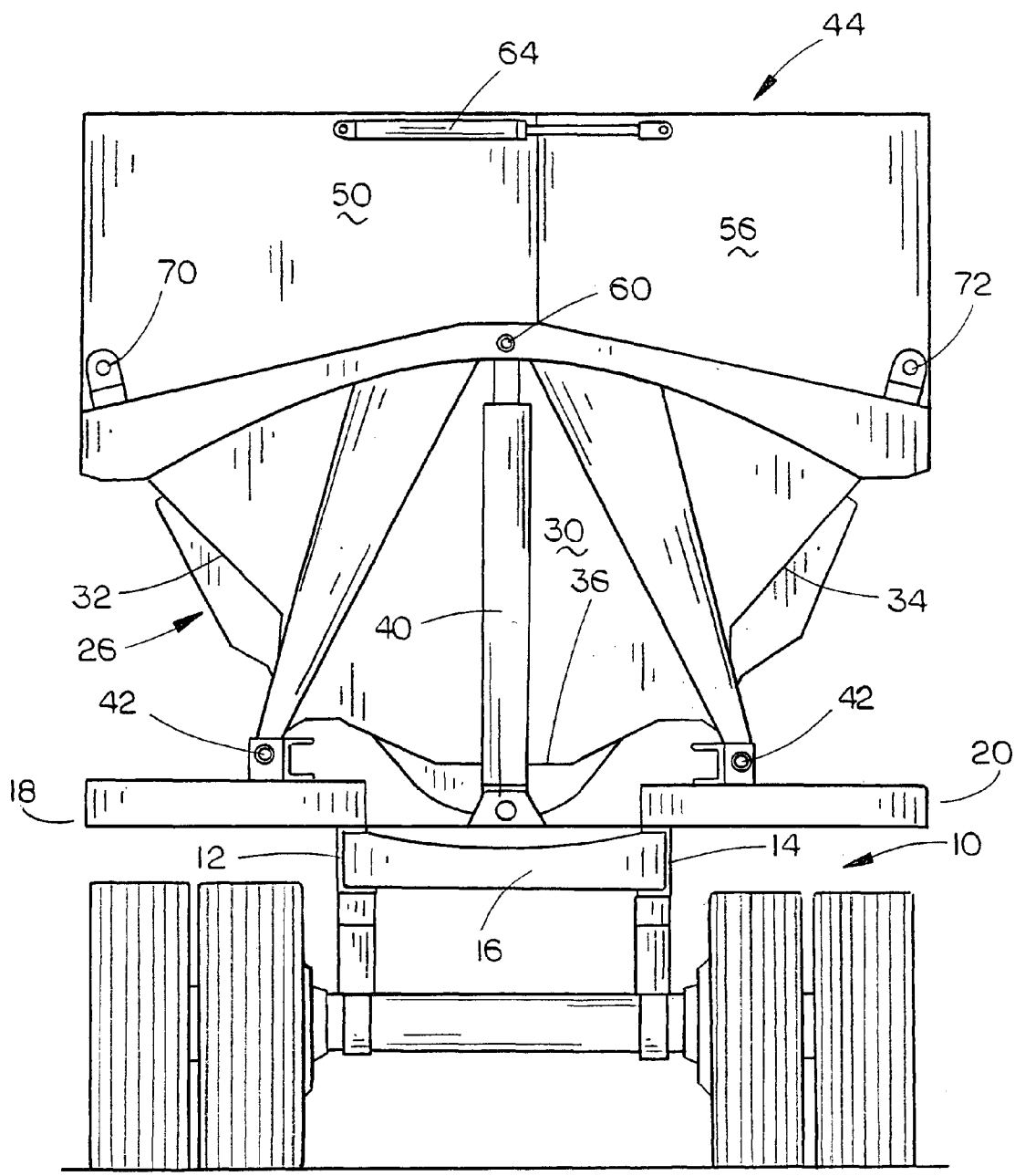
FIG. 3 is a rear view of the embodiment of FIG. 1 with the wall extension apparatus being illustrated in a transport position.
Figure 4:
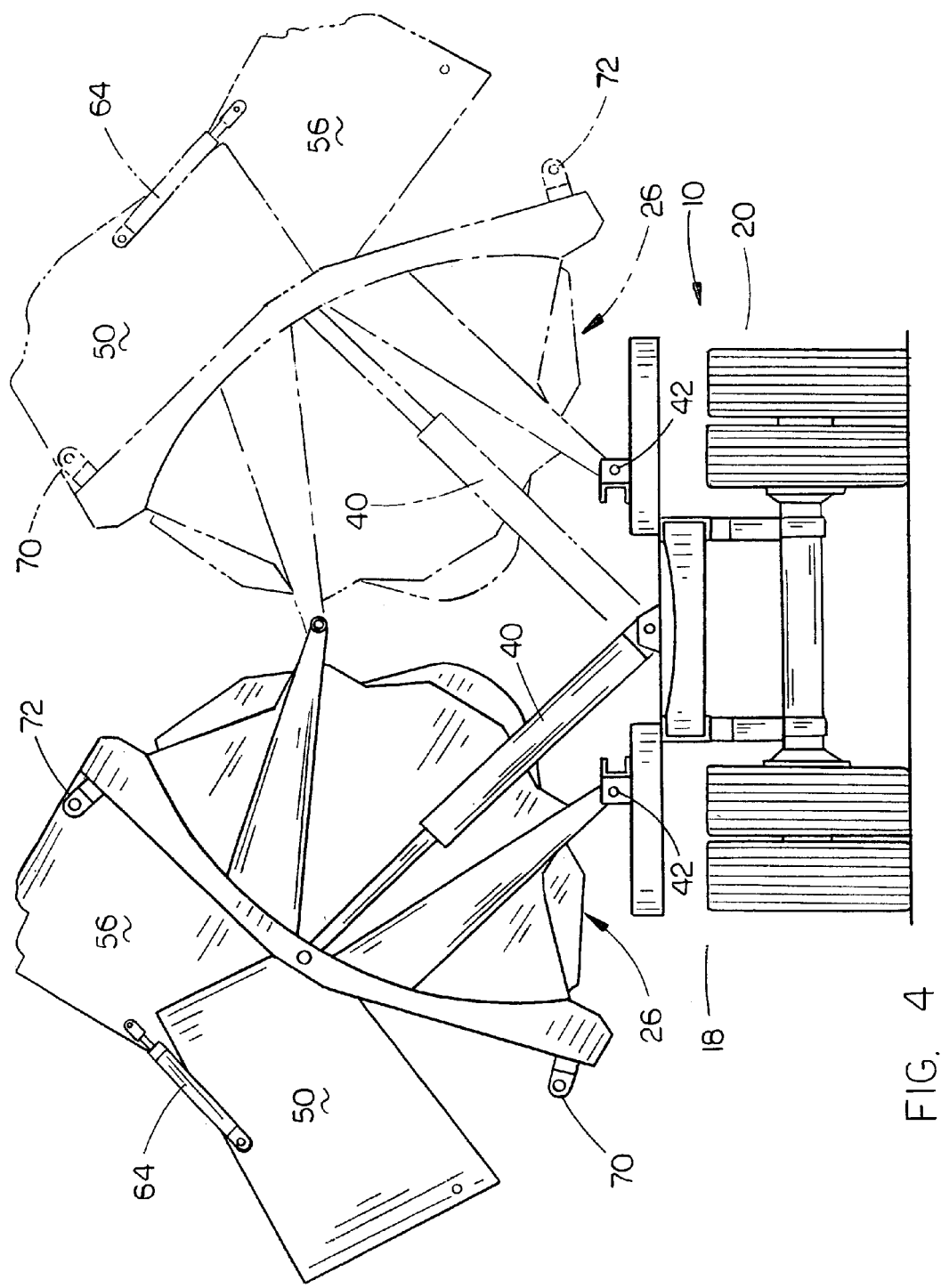
FIG. 4 is a rear view illustrating the embodiment of FIGS. 1-3 in a first side dumping position with the dotted lines illustrating the wall extension apparatus in its second side dumping position.
Figure 5:
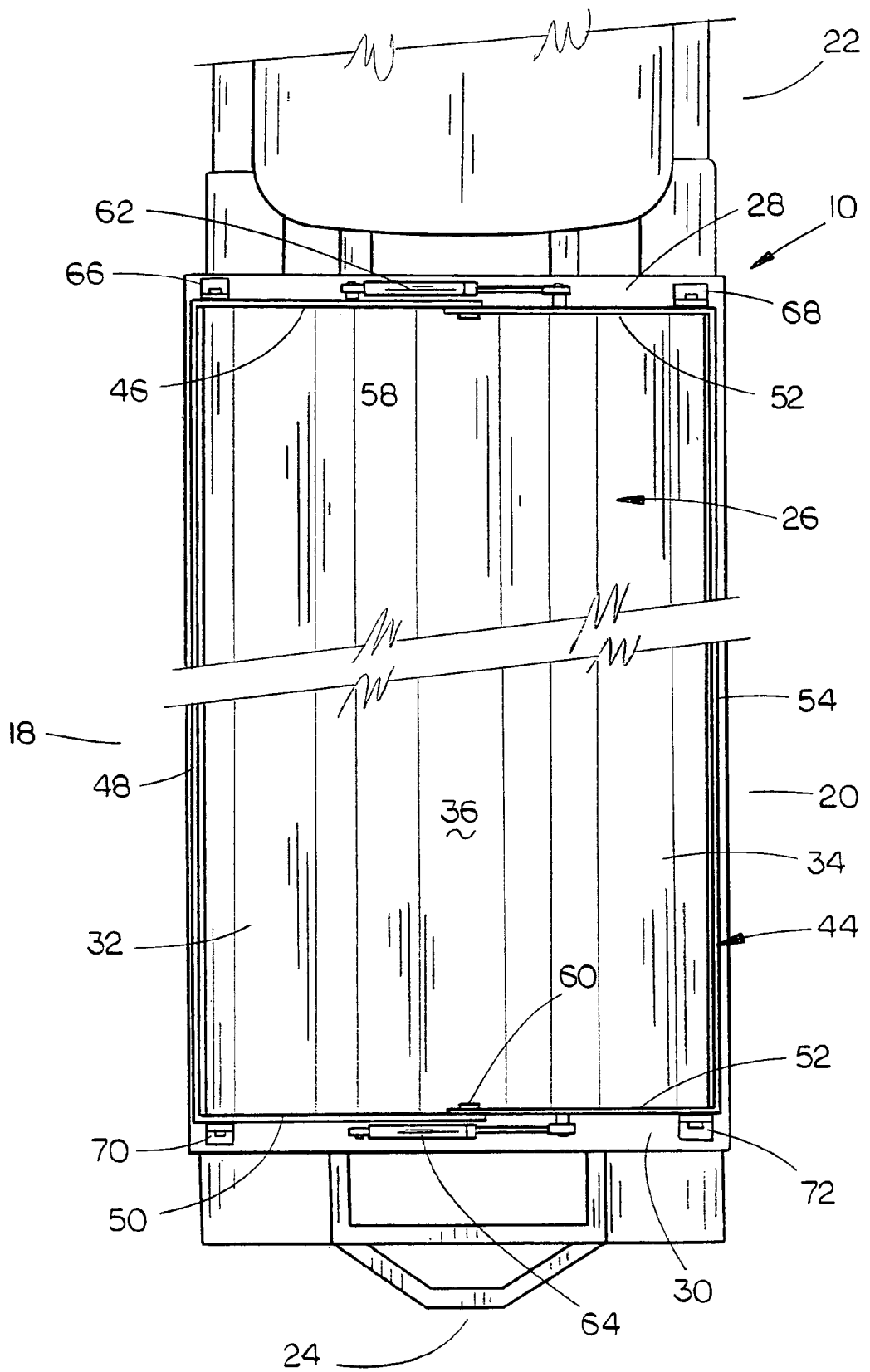
FIG. 5 is a partial top view of the embodiment of FIGS. 1-4.

When the wall extension apparatus 44 is in the transport position of FIG. 3, the locking pins 66, 68, 70 and 72 are in their locked positions to maintain the lower ends of the wall members 46, 52, 48, 54, 50 and 56 in sealing engagement with the upper ends of the end walls and side walls of the side dump body 26. With the wall extension apparatus 44 in the transport position of FIG. 3, the carrying capacity of the side dump body 26 is greatly increased. Although it is preferred that the wall extension apparatus 44 be constructed of steel or aluminum, other materials may be possibly used.

When the side dump body 26 and the wall extension apparatus 44 have been filled with material and the vehicle is driven to the dumping site, the material or contents within the side dump body 26 may be dumped from either side of the side dump body in conventional fashion. Assuming that the side dump body 26 is to be dumped to the left or first side of the truck or trailer, as seen in FIG. 1, the locking pins 42 on the right side of the side dump body 26 will be unlocked and the hydraulic cylinders 38 and 40 will be extended to pivotally move the side dump body 26 from the position of FIG. 3 to the position of FIG. 1. Prior to actuating the hydraulic cylinders 38 and 40, the locking pins 66 and 70 will be unlocked. The hydraulic cylinders 38 and 40 will then be partially extended to tip the side dump body 26 towards its first side dumping position. The hydraulic cylinders 62 and 64 will then be retracted so the wall members 46, 48 and 50 pivotally move upwardly with respect to the side dump body 26 so that the material or contents of the side dump body 26 may pass from the side dump body 26 beneath the lower edges of the wall members 46, 48 and 50.

When the material or contents have been dumped from the side dump body 26, the side dump body 26 will be returned to its transport position and the hydraulic cylinders 62 and 64 will be extended to cause the lower ends of the wall members 46, 48 and 50 to again engage the upper ends of the side dump body 26. The locking pins 66 and 70 will again be locked.

If the material is to be dumped from the second side of the side dump body 26, the locking pins 68 and 72 are disconnected rather than the locking pins 66 and 70 as previously described. That permits the lower ends of the wall members 52, 54 and 56 to pivotally move upwardly with respect to the upper ends of the side dump body 26 to enable the material to be dumped from the second side of the side dump body 26 beneath the lower ends of the members 52, 54 and 56.

Figure 6:
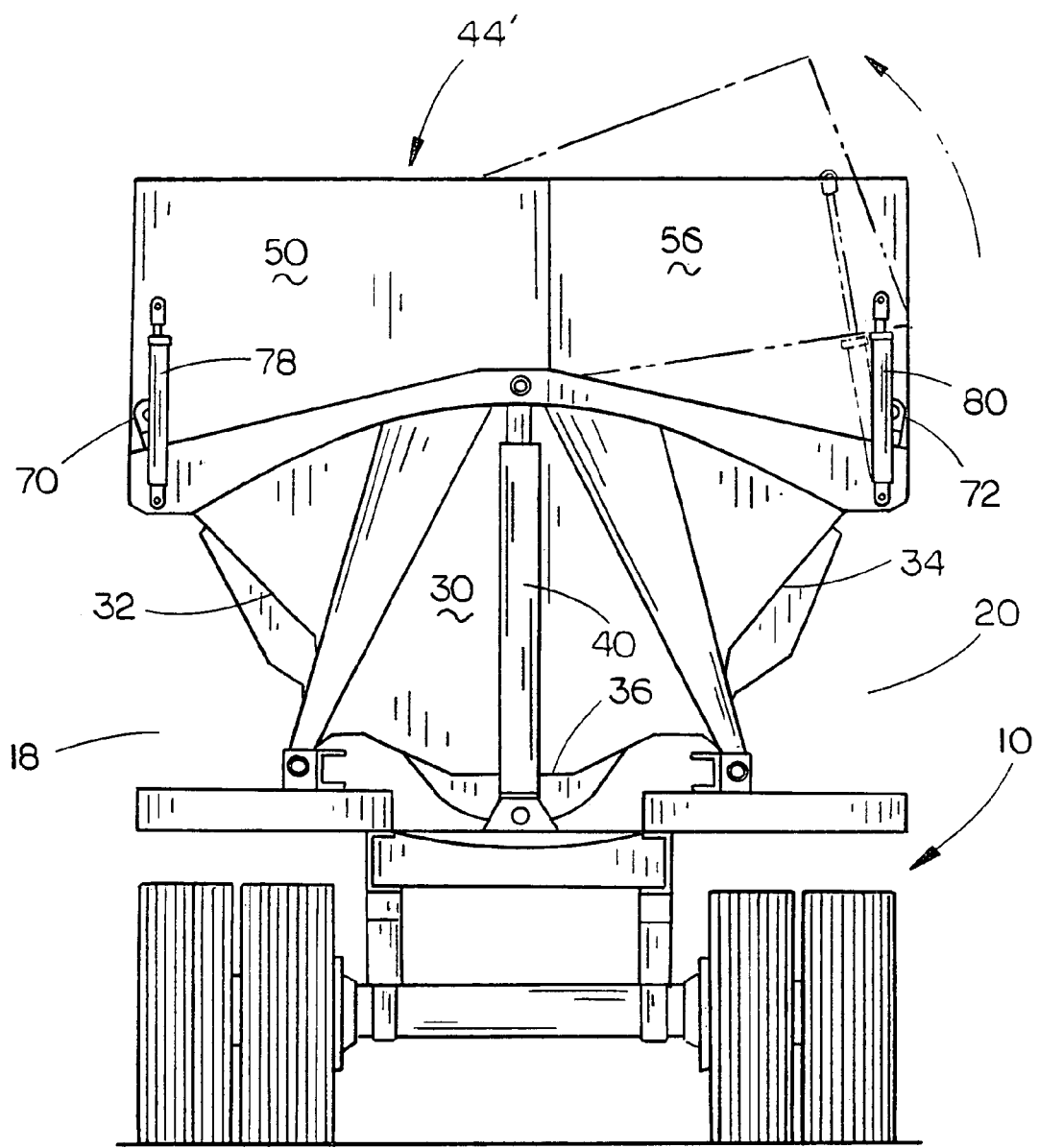
FIG. 6 is a rear view illustrating the second embodiment of the wall extension apparatus.
Figure 7:
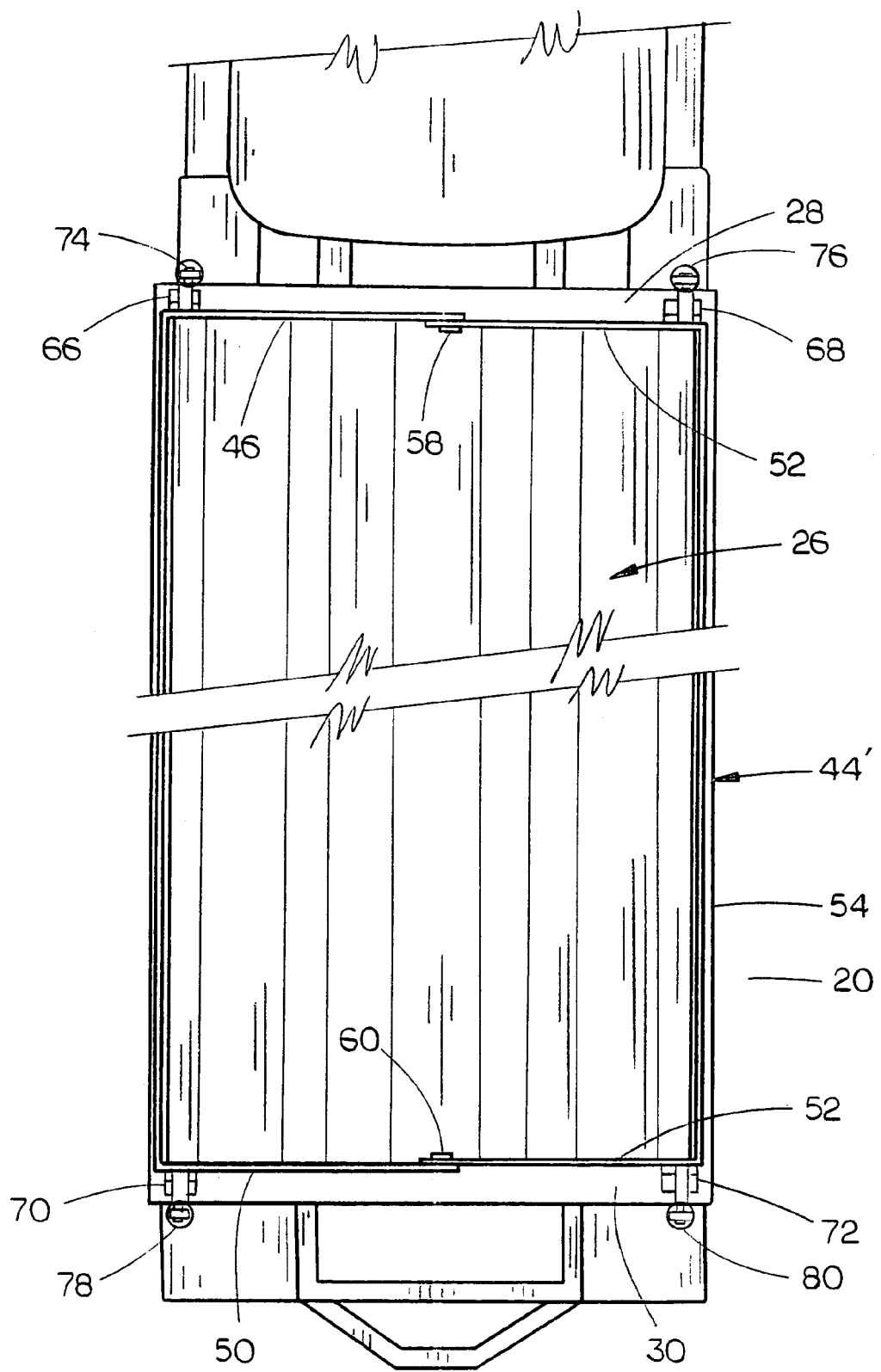
FIG. 7 is a partial top view of the second embodiment of FIG. 6.

The second embodiment of the wall extension apparatus is illustrated in FIGS. 6 and 7 and is referred to generally by the reference numeral 44'. The only difference between the embodiments of FIGS. 1-5 and that of FIGS. 6 and 7 is that a pair of hydraulic cylinders 74 and 76 are provided at the forward end of the wall extension apparatus and a pair of hydraulic cylinders 78 and 80 are provided at a rearward end of the wall extension apparatus. Hydraulic cylinder 74 is pivotally connected to and extends between the first forward end wall member 46 and the framework of the forward end wall 28. Hydraulic cylinder 76 is pivotally secured and extends between the second forward end wall member 52 and the framework of the forward end wall 28 of side dump body 26. Hydraulic cylinder 78 is pivotally secured to and extends between the first rearward end wall member and the framework of the rearward wall 30 of side dump body 26. Hydraulic cylinder 80 is pivotally secured to and extends between the second rearward end wall member 52 and the framework of rearward end wall 30 of side dump body 26. The embodiment of FIGS. 6 and 7 also includes the removable locking pins 66, 68, 70 and 72.

The extension wall apparatus 44' is pivotally movable to its first side dumping position by the extension of the hydraulic cylinders 74 and 78 when the locking pins 66 and 70 have been unlocked. The wall extension apparatus 44' is moved to its second side dumping position by the extension of the hydraulic cylinders 76 and 80 when the locking pins 68 and 72 have been unlocked.

Figure 8:
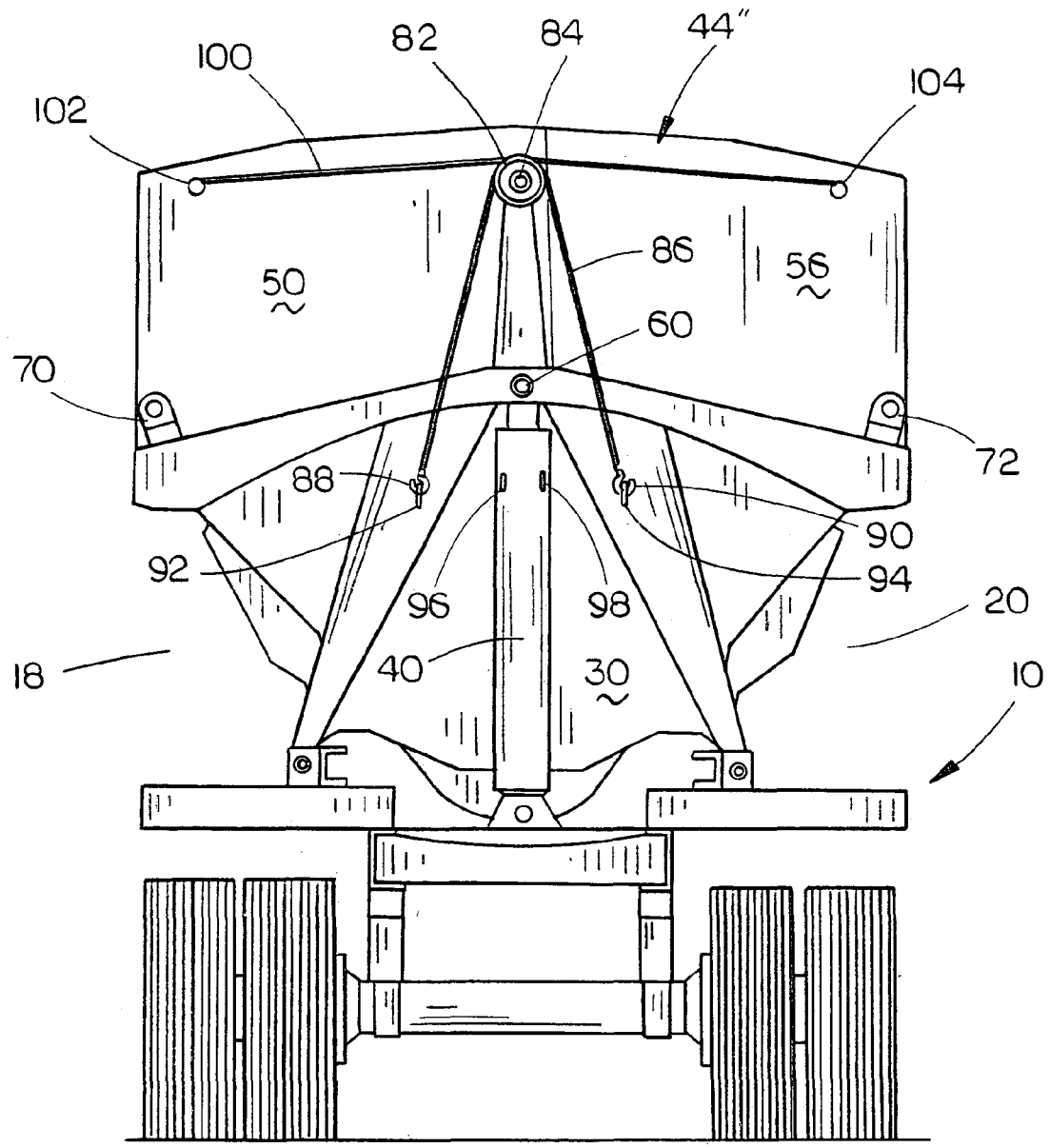
FIG. 8 is a rear view of the third embodiment of the wall extension apparatus.
Figure 9:
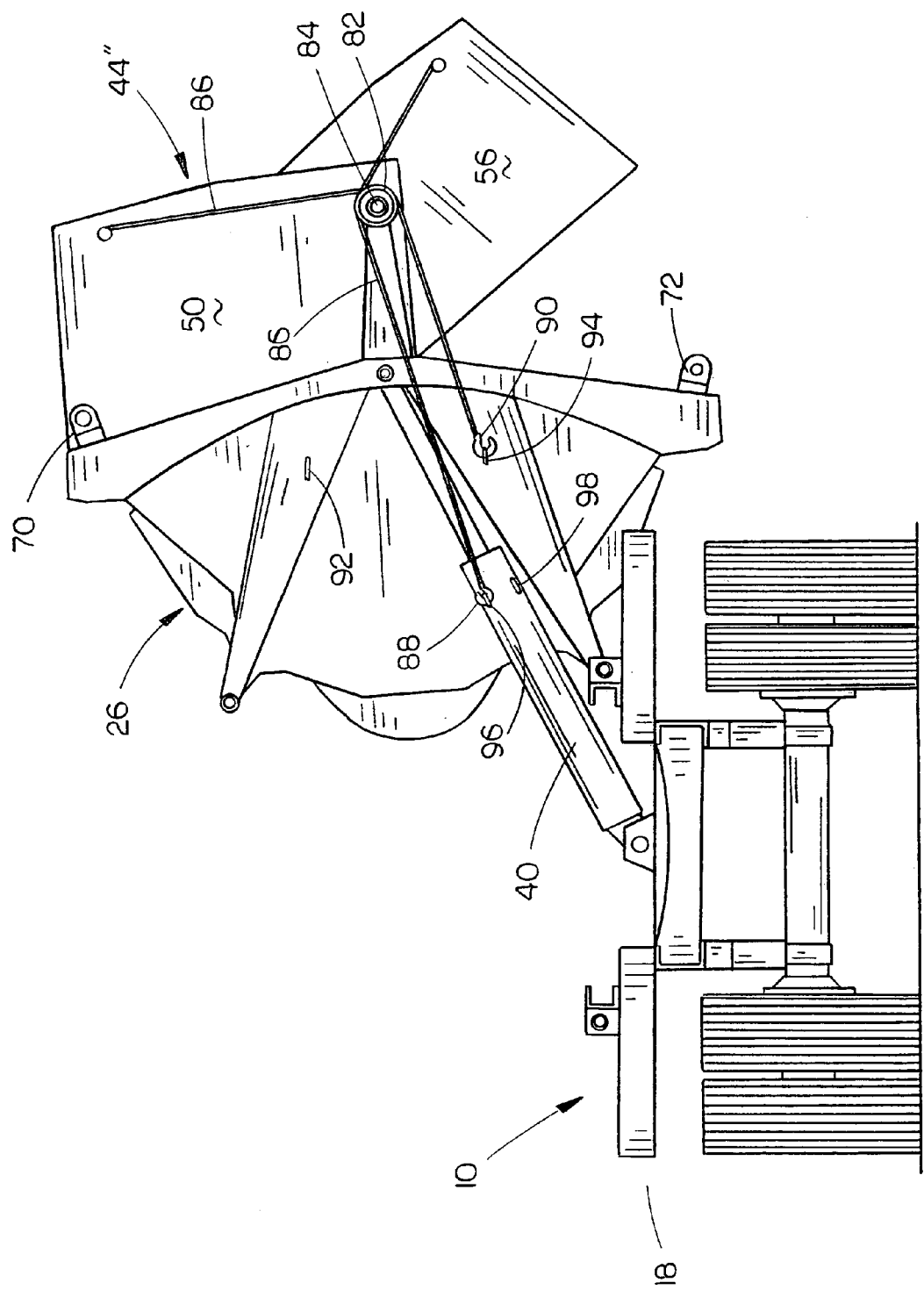
FIG. 9 is a rear view of the embodiment of FIG. 8 illustrating the wall extension apparatus in its second side dumping position.

The third embodiment of this invention is illustrated in FIGS. 8 and 9. The wall extension apparatus of the embodiment of FIGS. 8 and 9 is referred to generally by the reference numeral 44" and includes all of the structure of the wall extension apparatus 44 except that the hydraulic cylinders for moving the wall extension apparatus between its transport, first side dumping and second side dumping positions are not used but have been replaced by a pulley and cable arrangement at each of the forward and rearward ends of the wall extension apparatus.

As seen in FIGS. 8 and 9, a double sheave pulley 82 is rotatably secured, about a horizontal axis referred to generally by the reference numeral 84 which is secured or mounted on the first rearward wall member 50 or other suitable mounting structure. A first elongated flexible cable 86 extends around one of the sheaves of the pulley 82 and has its ends 88 and 90 normally secured to eyelets 92 and 94 respectively which are secured to the framework of the rearward wall 30 of side dump body 26 on opposite sides of the hydraulic cylinder 40. As seen in FIG. 8, hydraulic cylinder 40 also has a pair of eyelets 96 and 98 provided on the body thereof. A second cable 100 has its opposite ends secured to the exterior surfaces of the rearward end wall members 50 and 56 at 102 and 104. The cable 100 is completely wrapped around the second sheave of the pulley 82. The first and second sheaves are secured together so that rotation of one of the sheaves causes rotation of the other sheave.

When the wall extension apparatus 44''' is in its transport position of FIG. 8, the ends 88 and 90 of cable 86 will be connected to the eyelets 92 and 94 which prevents rotation of the sheave 82. FIG. 9 illustrates the wall extension apparatus 44" in its second side dumping position. To permit the wall extension apparatus 44" to be moved to its second side dumping position, the end 88 of cable 86 is connected to eyelet 96 on hydraulic cylinder 40 and the end 90 remains connected to the eyelet 94. The locking pins 66 and 70 are unlocked and the extension of hydraulic cylinder 40 causes the cable 86 to rotate the sheave 82 which causes the cable 86 to be "shortened" adjacent one end thereof which causes the second end wall member 58, the second side wall member 54 and the second forward end wall member 52 to be moved upwardly with respect to the side dump body 26 so that material can be dumped therefrom beneath the members 52, 54 and 56.

When the hydraulic cylinder 40 is retracted, the side dump body 26 and the wall extension apparatus 44" return to their transport positions. If it is desired to dump the contents of the side dump body 26 from the first side thereof, end 88 of cable 86 will be connected to eyelet 92 and end 90 of cable 86 will be connected to eyelet 98 on hydraulic cylinder 40. The cable and pulley arrangement illustrated in FIGS. 8 and 9 is duplicated at the forward end of the wall extension apparatus 44".

Figure 10:
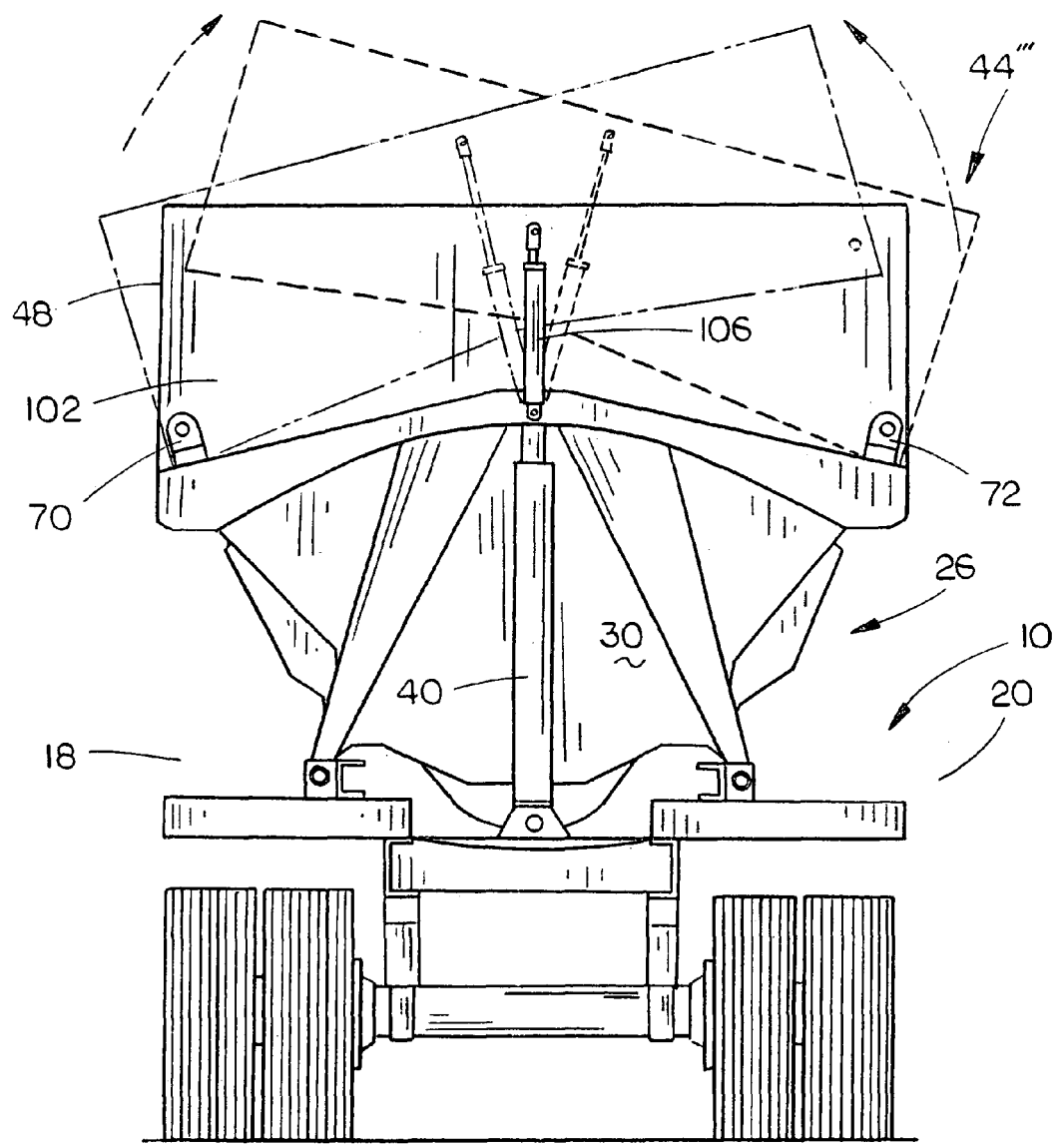
FIG. 10 is a rear view of the fourth embodiment of the wall extension apparatus with the broken lines illustrating the wall extension apparatus in its first and second side dumping positions.
Figure 11:
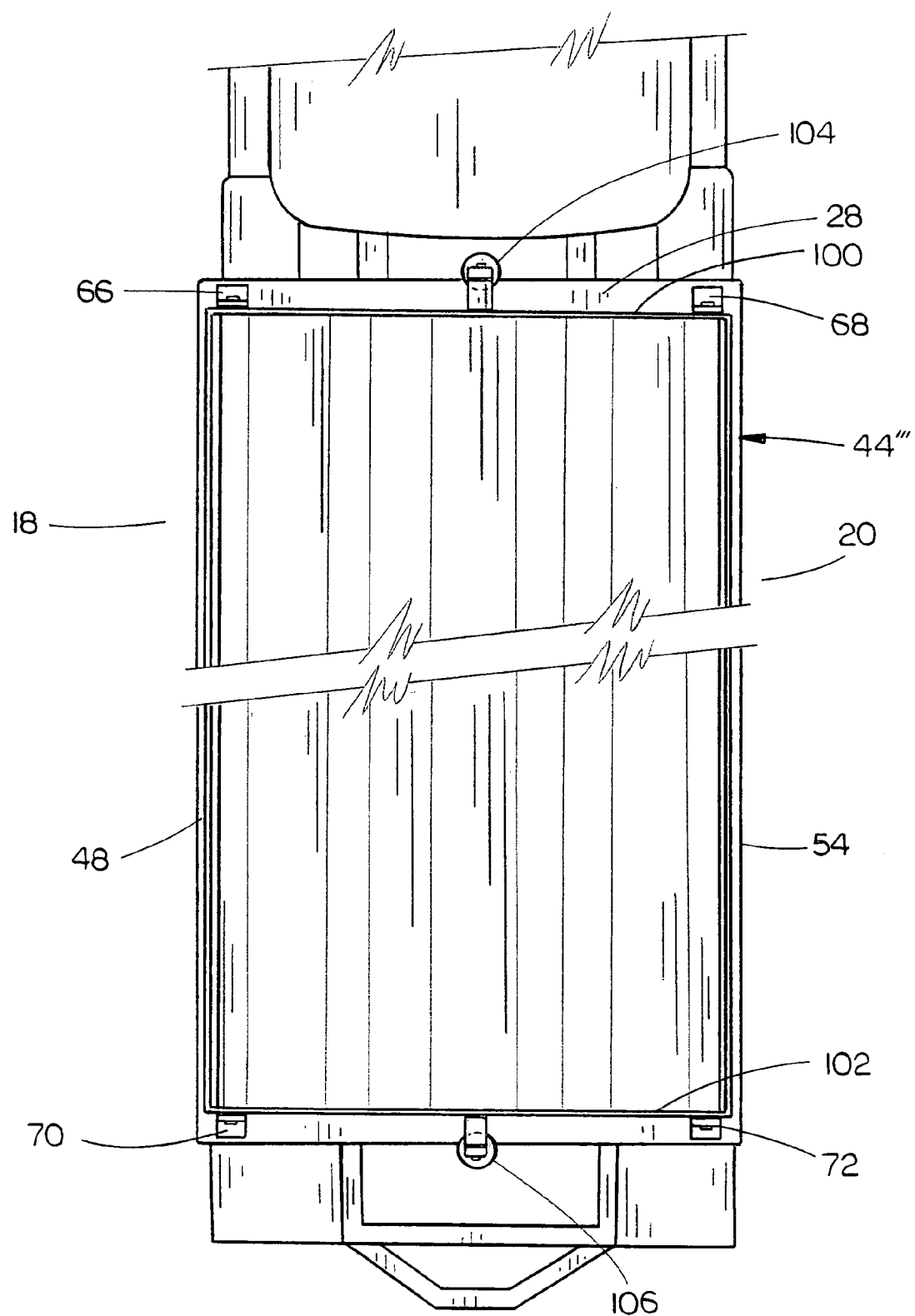
FIG. 11 is a partial top view of the fourth embodiment of FIG. 10.

The wall extension apparatus illustrated FIGS. 10 and 11 is referred to generally by the reference numeral 44'''. The primary differences between apparatus 44''' and apparatus 44 is that a single forward end wall member 100 replaces forward end wall members 46 and 52 and that a single rearward end wall member 102 replaces rearward end wall member 50 and 56. A first side wall member 48 is secured to and extends between the left ends of forward end wall member 100 and rearward end wall member 102. A second side wall member 54 is secured to and extends between the right ends of forward end wall member 100 and rearward wall member 102. The wall members 100, 102, 48 and 54 form a generally rectangular box-like wall extension apparatus. Locking pins 66, 68, 70 and 72 are also used with this embodiment. A hydraulic cylinder 104 is pivotally secured to and extends between the framework of forward end wall 28 of side dump body 26 and forward end wall member 100. A hydraulic cylinder 106 is pivotally secured to and extends between the framework of end wall 30 of side dump body 26 and rearward wall member 102. When locking pins 66 and 70 are unlocked, the extension of cylinders 104 and 106 will cause wall extension apparatus 44''' to move from its transport position illustrated by solid lines in FIG. 10 in the broken line position of FIG. 10. When locking pins 68 and 72 are unlocked, the extension of cylinders 104 and 106 causes the wall extension apparatus to move to its second side dumping apparatus also illustrated by broken lines in FIG. 10.

Figure 12:
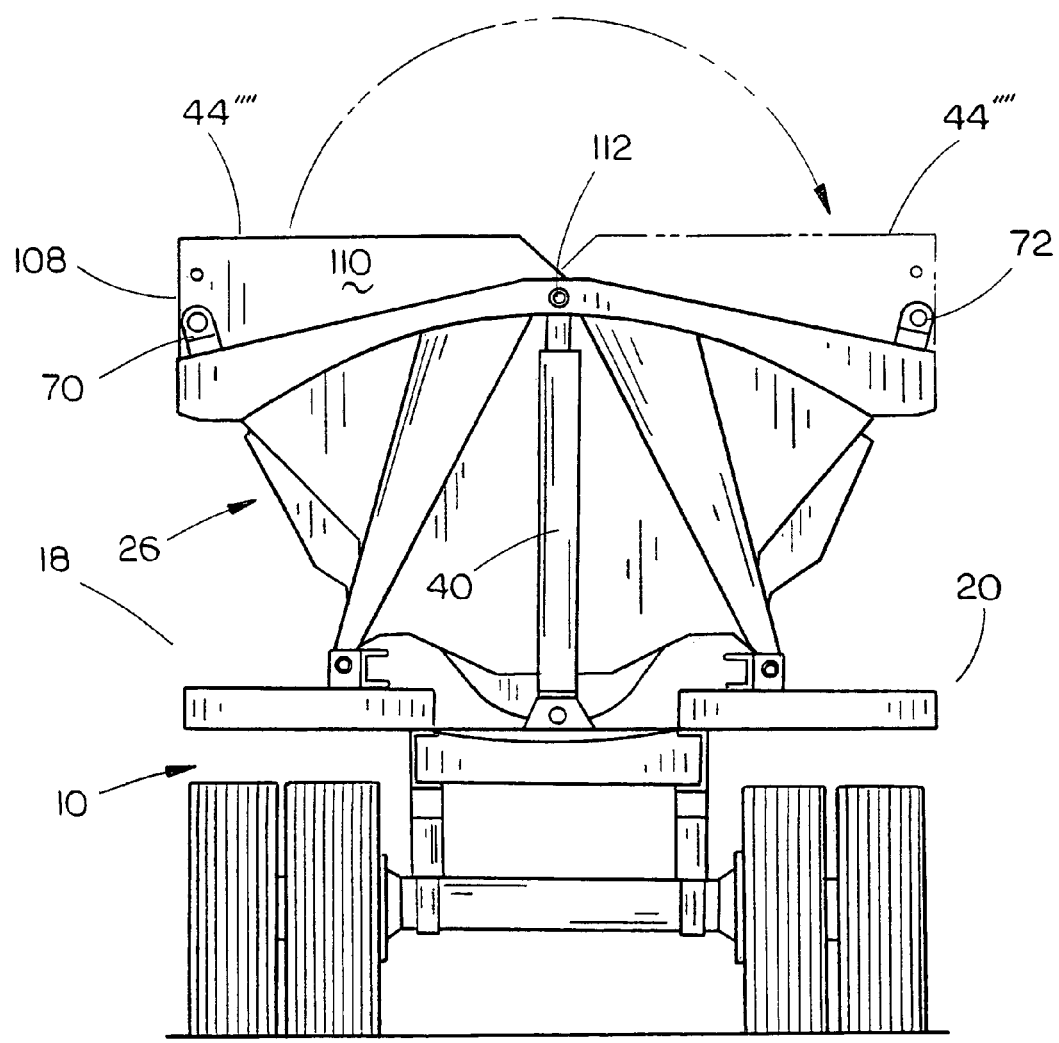
FIG. 12 is a rear view of a fifth embodiment of the wall extension apparatus.

A further embodiment of the wall extension apparatus is illustrated in FIG. 12 and is referred to by the reference numeral 44"". Apparatus 44"" is manually movable between its transport position shown by solid and broken lines in FIG. 12. Apparatus 44"" utilizes a single side wall member 108 which extends between identical end wall members 110 positioned at the forward and rearward ends thereof which extend inwardly therefrom and which are pivotally secured to the end walls of the side dump body 26 at 112.

The invention claimed is:

1. In combination:
 a wheeled frame having a forward end, a rearward end, a first side and a second side;
 a side dump body movably mounted on said wheeled frame and having a rearward end, a forward end, a first side, a second side and an open upper end;
 side dump body including a bottom wall, first and second side walls extending upwardly from said bottom wall, a forward end wall, and a rearward end wall;
 each of said first and second side walls of said side dump body having forward and rearward ends;
 each of said forward and rearward end walls of said side dump body having first and second ends;
 said side dump body being pivotally movable with respect to said wheeled frame so as to be able to dump contents thereof towards said first side or said second side of said wheeled frame;
 a box-like wall extension apparatus movably positioned on upper ends of ones of said walls of said side dump body;
 said wall extension apparatus including: (a) an upstanding first side wall member having an upper end, a lower end, a forward end and a rearward end, (b) an upstanding second side wall member having an upper end, a lower end, a forward end and a rearward end, (c) a first upstanding forward wall member having an upper end, a lower end, an outer end and an inner end, (d) a second upstanding forward wall member having an upper end, a lower end, an outer end and an inner end, (e) a first upstanding rearward wall member having an upper end, a lower end, an outer end and an inner end, and (f) a second upstanding rearward wall member having an upper end, a lower end, an outer end and inner end;
 said first and second forward wall members of said wall extension apparatus extending inwardly towards one another from said forward ends of said first and second side walls of said side dump body respectively with the inner ends thereof overlapping one another;
 said first and second rearward wall members of said wall extension apparatus extending inwardly towards one another from said rearward ends of said first and second side walls of said side dump body respectively with the inner ends thereof overlapping one another;
 said outer ends of said first and second forward wall members of said wall extension apparatus being selectively secured to said forward ends of said first and second side walls of said side dump body respectively;
 said outer ends of said first and second rearward wall members of said wall extension apparatus being selectively secured to said rearward ends of said first and second side walls of said side dump body respectively;
 said first forward end wall member, said first side wall member and said first rearward wall member of said wall extension apparatus being selectively movable with respect to said side dump body between a transport position and a first side dumping position;
 said lower ends of said first forward wall member, said first side wall member and said first rearward wall member of said wall extension apparatus being in engagement with said upper ends of said forward end wall, said first side wall and said rearward end wall of said side dump body when said wall members are in their transport position;
 said lower end of said first side wall member of said wall extension apparatus being spaced from said upper end of said first side wall of said side dump body when said wall members are in their first side dumping position;
 said second forward end wall member, said second side wall member and said second rearward wall member of said wall extension apparatus being selectively movable with respect to said side dump body between a transport position and a second side dumping position;
 said lower ends of said second forward end wall member, said second side wall member and said second rearward end wall member of said wall extension apparatus being in engagement with said upper ends of said forward end wall, said second side wall and said rearward end wall of said side dump body when said wall members are in their transport position;
 said lower end of second side wall member of said wall extension apparatus being spaced from said upper end of said second side wall of said side dump body when said wall members are in their second side dumping position;
 said lower outer ends of said first forward end wall member, said second forward end wall member; said first rearward end wall member and said second rearward end wall member being selectively removably secured to said forward end wall and said rearward end wall of said side dump body respectively;
 said lower inner ends of said first forward end wall member and said second forward end wall members of said wall extension apparatus being hingedly secured to said forward end wall of said side dump body about a horizontal axis;
 said lower inner ends of said first rearward end wall member and said second rearward end wall member of said wall extension apparatus being hingedly secured to said rearward end wall of said side dump body about a horizontal axis;
 a first hydraulic cylinder pivotally secured to and extending between said first and second forward end wall members of said wall extension apparatus;
 a second hydraulic cylinder pivotally secured to and extending between said first and second rearward end wall members of said wall extension apparatus;
 said first and second hydraulic cylinders adapted to move said first forward end wall member, said first side wall member and said first rearward end wall member between their said transport and first side dumping position when the lower outer ends of said first forward end wall member and said first rearward end wall member of wall extension apparatus are disconnected from said forward and rearward end walls of said side dump body;
 said first and second hydraulic cylinders adapted to move said second forward end wall member, said second side wall member and said second rearward end wall member between their said transport and second side dumping positions when the lower outer ends of said second forward end wall member and said second rearward end wall member of wall extension apparatus are disconnected from said forward and rearward end walls of said side dump body.

2. The combination of claim 1 wherein a first selectively lockable pin selectively connects said lower end of said first forward end wall member of said wall extension apparatus, adjacent said first end thereof, to said forward end wall of said side dump body, adjacent said upper end thereof adjacent said first end thereof, and wherein a second selectively lockable pin selectively connects said lower end of said first rearward end wall member of said wall extension apparatus, adjacent said first end thereof, to said rearward end wall of said side dump body, adjacent said upper end thereof adjacent said first end thereof, and wherein a third selectively lockable pin selectively connects said lower end of said second forward end wall member of said wall extension apparatus adjacent said second end thereof, to said forward end wall of said side dump body, adjacent said upper end thereof adjacent said second end thereof, and wherein a fourth selectively lockable pin selectively connects said lower end of said second rearward end wall member of said wall extension apparatus adjacent said second end thereof to said rearward end wall of said side dump body, adjacent said upper end thereof adjacent said second end thereof.

3. In combination:
   - a wheeled frame having a forward end, a rearward end, a first side and a second side;
   - a side dump body movably mounted on said wheeled frame and having a rearward end, a forward end, a first side, a second side and an open upper end;
   - said side dump body including a bottom wall, first and second side walls extending upwardly from said bottom wall, a forward end wall, and a rearward end wall;
   - each of said first and second side walls of said side dump body having forward and rearward ends;
   - each of said forward and rearward end walls of said side dump body having first and second ends;
   - said side dump body being pivotally movable with respect to said wheeled frame so as to be able to dump the contents thereof towards said first side or said second side of said wheeled frame;
   - a wall extension apparatus movably positioned on upper ends of ones of said walls of said side dump body;
   - said wall extension apparatus being normally positioned in a transport position wherein said wall extension apparatus extends generally upwardly from said upper ends of said walls of said dump body to increase the carrying capacity of said side dump body;
   - said wall extension apparatus being selectively movable with respect to said side dump body from its said transport position to at least a first side dumping position.

4. The combination of claim 3 wherein said wall extension apparatus is also selectively movable to a second side dumping position.

5. The combination of claim 4 further including a plurality of locking devices which selectively lock said wall extension apparatus in its said transport position but which may be selectively unlocked to permit said wall extension apparatus to move to its said first and second side dumping positions.

* * * * *